US009784498B2

(12) United States Patent
Oelfke

(10) Patent No.: US 9,784,498 B2
(45) Date of Patent: Oct. 10, 2017

(54) METHOD FOR SEPARATING A FEED GAS IN A COLUMN

(71) Applicant: Russell H. Oelfke, Houston, TX (US)

(72) Inventor: Russell H. Oelfke, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 259 days.

(21) Appl. No.: 14/688,786

(22) Filed: Apr. 16, 2015

(65) Prior Publication Data

US 2015/0362251 A1   Dec. 17, 2015

Related U.S. Application Data

(60) Provisional application No. 62/010,664, filed on Jun. 11, 2014.

(51) Int. Cl.
*F25J 3/00* (2006.01)
*F25J 3/06* (2006.01)
(Continued)

(52) U.S. Cl.
CPC ............ *F25J 3/067* (2013.01); *B01D 3/166* (2013.01); *B01D 3/32* (2013.01); *F25J 3/0209* (2013.01); *F25J 3/0233* (2013.01); *F25J 3/0266* (2013.01); *F25J 3/0295* (2013.01); *F25J 3/061* (2013.01); *F25J 3/063* (2013.01); *F25J 3/0695* (2013.01); *F25J 2200/02* (2013.01); *F25J 2200/76* (2013.01); *F25J 2200/90* (2013.01); *F25J 2205/04* (2013.01); *F25J 2205/20* (2013.01); *F25J 2210/02* (2013.01); *F25J 2270/02* (2013.01); *F25J 2270/04* (2013.01);
(Continued)

(58) Field of Classification Search
CPC   F25J 3/0695; F25J 3/061; F25J 3/0266; F25J 3/0209; F25J 3/067; F25J 3/0233; F25J 3/0635; F25J 2220/66; F25J 2220/82; F25J 2220/04; F25J 2205/04; F25J 2210/60; F25J 2280/40
See application file for complete search history.

(56) References Cited

U.S. PATENT DOCUMENTS

| 4,533,372 A | 8/1985 | Valencia et al. ................. 62/12 |
|---|---|---|
| 4,923,493 A | 5/1990 | Valencia et al. ................. 62/13 |

(Continued)

FOREIGN PATENT DOCUMENTS

DE   197 39 473   3/1999

OTHER PUBLICATIONS

U.S. Appl. No. 14/516,683, filed Oct. 17, 2014, Valencia, J. A. et al.
(Continued)

*Primary Examiner* — Frantz Jules
*Assistant Examiner* — Brian King
(74) *Attorney, Agent, or Firm* — ExxonMobil Upstream Research Company Law Department

(57) ABSTRACT

A system and methods for processing a feed gas in a column are provided herein. A method includes feeding a feed gas into a port of a sleeve disposed around at least a portion of a periphery of the column. The sleeve includes a space between an outer wall of the column and an inner wall of the column. The sleeve releases the feed gas into the column through an opening disposed at an opposite end of the sleeve from the port.

19 Claims, 8 Drawing Sheets

(51) Int. Cl.
*B01D 3/32* (2006.01)
*F25J 3/02* (2006.01)
*B01D 3/16* (2006.01)

(52) U.S. Cl.
CPC ........ *F25J 2270/88* (2013.01); *F25J 2280/40* (2013.01); *Y02C 10/12* (2013.01)

(56) References Cited

U.S. PATENT DOCUMENTS

| | | | |
|---|---|---|---|
| 5,062,270 A | 11/1991 | Haut | 62/12 |
| 5,120,338 A | 6/1992 | Potts et al. | 62/12 |
| 5,265,428 A * | 11/1993 | Valencia | B01D 3/18 |
| | | | 202/158 |
| 5,282,365 A | 2/1994 | Victor et al. | |
| 5,617,742 A * | 4/1997 | Toppel | F25J 3/04254 |
| | | | 62/643 |
| 5,819,555 A | 10/1998 | Engdahl | 62/637 |
| 5,956,971 A | 9/1999 | Cole et al. | 62/623 |
| 6,053,007 A | 4/2000 | Victory et al. | 62/619 |
| 6,082,133 A | 7/2000 | Barclay et al. | 62/619 |
| 6,516,631 B1 | 2/2003 | Trebble | 62/630 |
| 6,755,965 B2 | 6/2004 | Pironti et al. | 208/347 |
| 7,325,415 B2 | 2/2008 | Amin et al. | 62/541 |
| 2008/0034789 A1 | 2/2008 | Fieler et al. | 62/623 |
| 2009/0266107 A1* | 10/2009 | Singh | B01D 3/14 |
| | | | 62/617 |
| 2010/0018248 A1 | 1/2010 | Fieler et al. | 62/617 |
| 2012/0031144 A1 | 2/2012 | Northrop et al. | 62/617 |
| 2012/0079852 A1 | 4/2012 | Northrop et al. | 62/620 |
| 2012/0125043 A1* | 5/2012 | Cullinane | B01D 7/02 |
| | | | 62/620 |
| 2012/0204599 A1 | 8/2012 | Northrop et al. | 62/617 |
| 2012/0279728 A1 | 11/2012 | Northrop et al. | 166/401 |
| 2013/0074541 A1 | 3/2013 | Kaminsky et al. | 62/601 |
| 2013/0098105 A1 | 4/2013 | Northrop | 62/617 |
| 2014/0137599 A1 | 5/2014 | Oelfke et al. | 62/619 |
| 2014/0338395 A1 | 11/2014 | Oelfke et al. | 62/620 |
| 2015/0013377 A1 | 1/2015 | Oelfke | 62/602 |

OTHER PUBLICATIONS

U.S. Appl. No. 14/516,686, filed Oct. 17, 2014, Valencia, J. A.
U.S. Appl. No. 14/516,689, filed Oct. 17, 2014, Cullinane, J. T. et al.
U.S. Appl. No. 14/516,705, filed Oct. 17, 2014, Valencia, J. A. et al.
U.S. Appl. No. 14/516,709, filed Oct. 17, 2014, Valencia, J. A.
U.S. Appl. No. 14/516,713, filed Oct. 17, 2014, Valencia, J. A. et al.
U.S. Appl. No. 14/516,717, filed Oct. 17, 2014, Valencia, J. A. et al.
U.S. Appl. No. 14/516,718, filed Oct. 17, 2014, Valencia, J. A.
U.S. Appl. No. 14/516,726, filed Oct. 17, 2014, Valencia, J. A. et al.
U.S. Appl. No. 14/516,731, filed Oct. 17, 2014, Valencia, J. A. et al.
U.S. Appl. No. 14/643,726, filed Mar. 10, 2015.
U.S. Appl. No. 14/661,621, filed Mar. 18, 2015.

* cited by examiner

200

700

METHOD FOR SEPARATING A FEED GAS IN A COLUMN

CROSS REFERENCE TO RELATED APPLICATIONS

This application claims the priority benefit of U.S. patent application No. 62/010,664 filed Jun. 11, 2014 entitled METHOD FOR SEPARATING A FEED GAS IN A COLUMN, the entirety of which is incorporated by reference herein.

FIELD

The present techniques relate generally to processing of natural gas or similar compounds to remove impurities. More particularly, the present techniques relate to distillation of natural gas or similar compounds having a relatively low carbon dioxide ($CO_2$) concentration to separate and remove the $CO_2$ from the natural gas.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

Most raw natural gas extracted from the Earth contains primarily methane ($CH_4$) and also contains, to varying degrees, low and high molecular weight hydrocarbon compounds. The primary component methane ($CH_4$), as a low molecular weight hydrocarbon, is typically a desirable component within harvested natural gas. Today, purified $CH_4$ is viewed as a valuable energy source because it is generally considered as a clean-burning fuel in numerous applications. Compared to other hydrocarbon fuels, the burning of $CH_4$ produces less carbon dioxide ($CO_2$) emissions for each unit of heat released. Additionally, based on its ratio of heat of combustion to its molecular mass, $CH_4$ produces more heat per mass unit than complex hydrocarbons. Furthermore, $CH_4$ may generally be transported with ease. Thus, in many cities, $CH_4$ is piped into homes for domestic heating and cooking purposes as an efficient fuel. In this context, $CH_4$ is usually known as natural gas, which has an energy content of ~1,000 BTU per standard cubic foot in certain examples. In the form of compressed natural gas, $CH_4$ may be used as a vehicle fuel where it may be more environmentally friendly than other fossil fuels such as gasoline or diesel.

Raw natural gas may need to be processed to remove contaminants and impurities such as heavier hydrocarbons including ethane ($C_2H_6$), propane ($C_3H_8$), and butane ($C_4H_{10}$), among others. When brought to the surface and processed along with the $CH_4$, such heavier hydrocarbons are collectively referred to as Natural Gas Liquids (NGLs). The raw natural gas may also include acid gas contaminants such as carbon dioxide ($CO_2$) and hydrogen sulfide ($H_2S$), and mercaptans, such as methanethiol ($CH_3SH$) and ethanethiol ($C_2H_5SH$). Additionally, the raw natural gas may contain contaminants including nitrogen ($N_2$), helium (He), water vapor, liquid water, mercury, and natural gas condensate.

The heavier hydrocarbons, NGLs, and contaminants within the raw natural gas may lead to equipment malfunction, production failure, product contamination, among other detrimental production issues. For example, when the acid gas contaminant $CO_2$ is combined with water, it may create a corrosive form of carbonic acid. Additionally, $CO_2$ will reduce the BTU value of the natural gas and lower the economic viability of the natural gas, for example, in concentrations of more than 2%. Similarly, $H_2S$ can dissolve in water to create a highly corrosive acid that can attack metal structures. Moreover, water in the form of a vapor or liquid within a raw natural gas may form hydrates, thus, potentially leading to plugging of pipelines. Thus, it may be economically beneficial to remove the contaminants from the natural gas to produce purified $CH_4$.

The separation techniques for purifying raw natural gas may utilize flash drums, separators, and distillation and fractionation towers. In some cases, the separation techniques may embody cryogenic temperatures where $CO_2$ may solidify and fall out of the natural gas. Other technologies for the removal of $CO_2$ from natural gas are based on principles that do not involve cryogenic temperatures. For example, some techniques may be solvent-based, such as capturing $CO_2$ with a chemical, physical, or hybrid solvent, and reversing the process to remove the captured $CO_2$.

U.S. Pat. No. 7,325,415 discloses a process and device for the removal of solid freezable species such as carbon dioxide, water, and heavy hydrocarbons from a natural gas feed stream during liquefaction to produce LNG. The solid freezable species may be removed on a continuous basis following liquefaction of the natural gas feed stream. The solid freezable species may then be liquefied on a continuous basis if required. Continuous removal of the freezable species from the natural gas feed stream is apparently achieved by maintaining both cooling and separation apparatuses at the same working pressure. The technique provides that at least part of the cooling vessel is constructed from a material having a low thermal conductivity which discourages formation of the solids of the freezable species on the walls of the cooling vessel.

U.S. Pat. No. 6,755,965 discloses a process for ethane extraction from a gas stream based on turbo-expansion and fractionation with no mechanical refrigeration. The feed gas is sweetened and dehydrated by a conventional amine process followed by a molecular sieve unit to remove carbon dioxide and water. After this pretreatment, the feed gas undergoes a series of cooling steps through a cryogenic brazed aluminum heat exchanger and is fed to a de-methanizer column. A rich-methane stream is recovered from the top of this column and fed to a centrifugal compressor and subsequently routed to a booster/turbo-expander. The temperature of the methane gas is reduced by the expansion allowing the cooled methane stream to be a cooling source for the cryogenic heat exchanger. A feed for a de-ethanizer column comes from the bottom liquids of the de-methanizer column. Thus, ethane is recovered overhead from the de-ethanizer column.

U.S. Pat. No. 6,516,631 discloses a cryogenic natural gas liquids recovery process, which includes the use of a de-methanizer and a de-ethanizer. The recovery process also includes a step of recycling a portion of the de-ethanizer overhead to the de-methanizer.

U.S. Pat. No. 6,082,133 discloses an apparatus for separating $CO_2$ from a mixture of gases having $CO_2$ and a second gas, where the apparatus includes an active heat exchanger and a regenerating heat exchanger. The mixture of gases is present in the active heat exchanger at a predetermined pressure, which is chosen such that $CO_2$ freezes on the heat exchanger surface. The heat exchanger surface is cooled by a refrigerant having a temperature below that at which $CO_2$ freezes at the predetermined pressure. The regenerating heat exchanger includes a heat exchange surface in contact with the refrigerant and also in contact with a layer of frozen $CO_2$. The refrigerant enters the regenerating heat exchanger at a temperature above that at which the $CO_2$ in the frozen layer of $CO_2$ sublimates. The sublimation of the solid $CO_2$ cools the refrigerant prior to the refrigerant being expanded through an expansion valve, which reduces the temperature of the refrigerant to a point below the freezing point of $CO_2$ at the predetermined pressure. The refrigerant is re-compressed by a compressor after leaving the active heat exchanger. A second precooling heat exchanger precools the compressed refrigerant by providing thermal contact with the refrigerant leaving the active heat exchanger.

U.S. Pat. No. 5,819,555 discloses a process to remove $CO_2$ from a feed stream. The solid forming property of $CO_2$ and the low vapor phase solubility of carbon dioxide at cold temperatures form the basis for the separation process. The cooled feed stream enters a separation vessel where process means are provided to produce and separate $CO_2$ solids. The $CO_2$ is removed from the vessel as a $CO_2$ rich liquid stream, and a purified cold vapor is removed from the separation vessel as a product stream.

The aforementioned techniques may provide for purifying a raw gas stream. However, there remains an ongoing need for more efficient separation techniques to purify the raw gas stream by removing $CO_2$ to produce purified $CH_4$ for use as a valuable energy source.

SUMMARY

An exemplary embodiment provides a method of controlling a temperature in a column. A method includes feeding a feed gas into a port of a sleeve disposed around at least a portion of a periphery of the column. The sleeve includes a space between an outer wall of the column and an inner wall of the column. The sleeve releases the feed gas into the column through an opening disposed at an opposite end of the sleeve from the port.

Another exemplary embodiment provides a method of separating an acid gas component from a raw natural gas stream in a column. The method includes maintaining a temperature of a zone in the column below the freezing point of an acid gas component in a raw natural gas stream. The method includes feeding the raw natural gas stream at a temperature above the freezing point of the acid gas component into an upper portion of an internal sleeve disposed around a zone of the column. The method includes flowing the raw natural gas stream downward through the internal sleeve to cool the raw natural gas stream and warm an internal wall of the column in the zone, melting accumulated solids from the inner wall. The method also includes releasing the raw natural gas stream into the column at a lower portion of the zone.

Another exemplary embodiment provides a column for the separation of a feed gas. The column includes an internal sleeve section located around a periphery of a zone of the column. The column includes a feed gas inlet located in an upper region of the internal sleeve, where the internal sleeve is configured to channel the feed gas downward around the periphery of the column. The column includes an inner opening from the internal sleeve, configured to release the feed gas into the zone at a point below the feed gas inlet.

DESCRIPTION OF THE DRAWINGS

The advantages of the present techniques are better understood by referring to the following detailed description and the attached drawings, in which.

DETAILED DESCRIPTION

Figure 1:
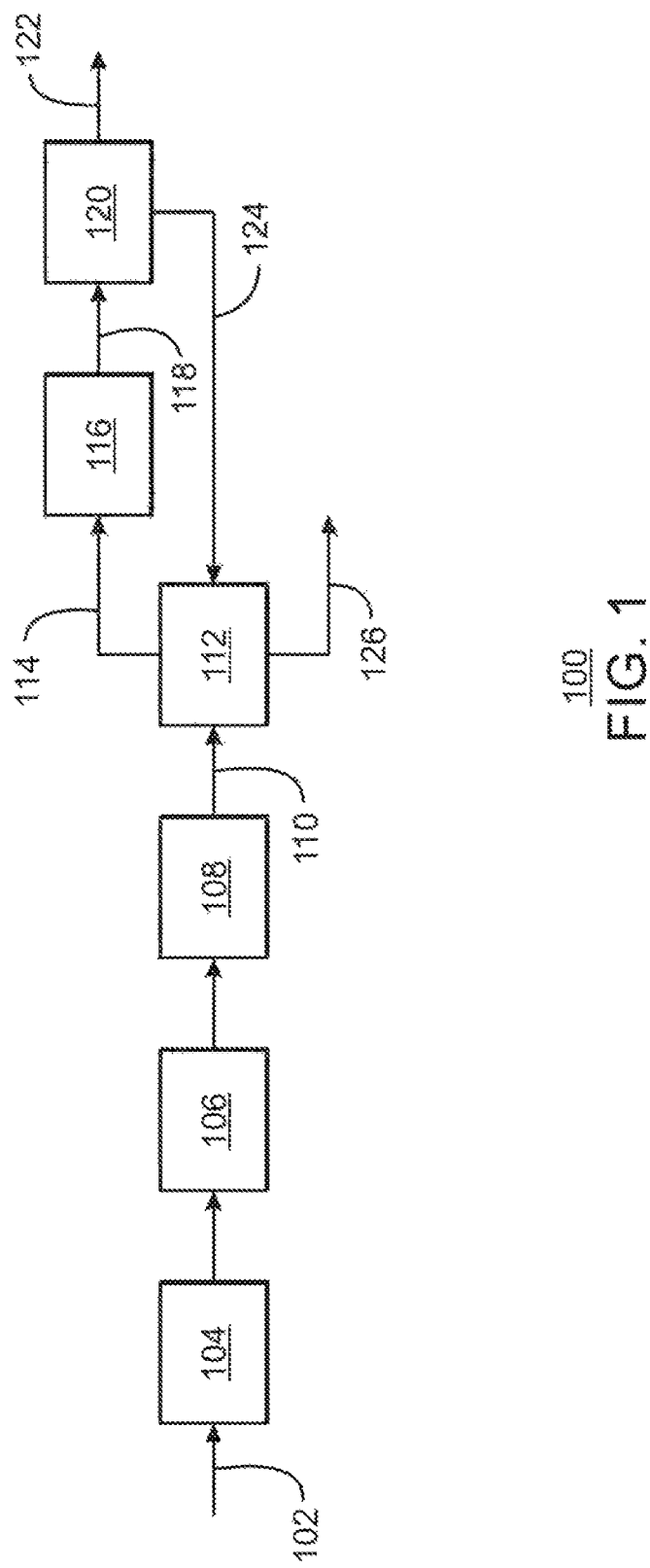
FIG. 1 is a block diagram of a system to process a feed gas.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Certain terms are used throughout the following description and claims to refer to particular features or components. As one skilled in the art would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The term "acid gas" refers to any gas that dissolves in water to produce an acidic solution. Non-limiting examples of acid gases include hydrogen sulfide ($H_2S$), carbon dioxide ($CO_2$), sulfur dioxide ($SO_2$), or mixtures thereof. The term "trace sulfur compounds" includes carbon disulfide ($CS_2$), carbonyl sulfide (COS), mercaptans, or mixtures thereof. The term "acid gas injection" (AGI) refers to the disposal of an acid gas stream by compressing it and introducing the pressurized stream into a subterranean reservoir.

The term "controlled freeze zone process" or "cryogenic distillation" refers to a process that takes advantage of the freezing potential of carbon dioxide in cryogenic distillation, rather than avoiding solidification of carbon dioxide. In the controlled freeze zone process, acid gas components are separated by cryogenic distillation through the controlled freezing and melting of carbon dioxide in a single column, without the use of freeze-suppression additives. The controlled freeze zone process uses a cryogenic distillation column with a special internal section (controlled freeze zone section) to handle the solidification and melting of $CO_2$. This controlled freeze zone section (or "CFZ section") does not contain packing or trays like conventional distillation columns, instead it contains one or more spray nozzles and a melting tray. Solid carbon dioxide forms in the vapor space in the CFZ section and falls into the liquid on the melt tray. Substantially all of the solids that form are confined to the controlled freeze zone section. In the rectification section above the CFZ section, methane ($CH_4$) is enriched to produce an overhead $CH_4$-rich stream suitable for sale, while the stripping section below the CFZ section generates a liquid bottoms stream containing contaminants such as carbon dioxide ($CO_2$) and hydrogen sulfide ($H_2S$) with very little residual methane.

The term "melt tray" refers to a component within a controlled freeze zone of a column where solid contaminants may be warmed and melted to exit the melt tray and flow into a lower stripping section of a column.

The term "rectification section" refers to a section of a cryogenic distillation column where an overhead $CH_4$ rich vapor stream may be purified to meet pipeline or liquid natural gas (LNG) feed quality via conventional distillation.

The term "stripping section" refers to a section of a cryogenic distillation column where a liquid bottoms stream, including containing contaminants such as $CO_2$ and $H_2S$, may be processed to recover $CO_2$ for injection into a well or for use in enhanced oil recovery efforts.

A sour natural gas produced from a reservoir may contain acid gases, including $CO_2$ and $H_2S$, that may render the natural gas as unusable for direct gas sales or household use. Thus, it may be advantageous to use a cryogenic distillation process to separate the acid gases from the natural gas released from the reservoir to generate a clean sales gas, which may include primarily methane ($CH_4$) gas. One particular cryogenic process that may be utilized includes the Controlled Freeze Zone™ (CFZ™) process, which is a single-step, cryogenic process for the separation of $CO_2$ and $H_2S$ from natural gas involving the controlled freezing and remelting of $CO_2$. The CFZ™ process may enable the production of sales-quality gas at lower costs while advantageously handling gases with a wide range of $CO_2$ and $H_2S$ content. This unconventional cryogenic distillation process may include feeding the raw natural gas into a lower section of a column where lighter vapors may rise upward into a controlled freeze zone and a rectification zone to be purified and to exit the column as a purified $CH_4$ stream. As the vapor-phase $CH_4$ is stripped from the raw natural gas, a liquefied acid gas stream, including contaminants such as $CO_2$ and $H_2S$, may emerge and may exit the lower stripping section of the column as a liquid for disposal or additional processing.

When the $CO_2$ content of the feed gas is about 16 mol % or greater, the feed stream may be introduced to the CFZ™ process below the controlled freeze zone using conventional distillation tower internals. However, when the $CO_2$ content of the feed gas is lower than about 16 mol %, it is less efficient to introduce the feed stream below the melt tray.

In embodiments described herein, a feed gas with a lower $CO_2$ content may be fed at the freezing zone. To prevent freezing of $CO_2$ on the walls, the feed gas can be injected into an upper region of a hollow area positioned around the perimeter of the freezing zone. An opening in the lower region of the hollow area releases the feed gas above the melt zone.

FIG. 1 is a block diagram of a system 100 to process a feed gas in accordance with embodiments of the present techniques. The feed gas 102 may be a vapor or a multiphase fluid including methane ($CH_4$) and at least one acid gas, e.g., $CO_2$, $H_2S$. In examples, the feed gas 102 may include a $CO_2$ concentration range of less than about 16 mol %, or less than 15 about mol %, or less than about 14 mol %, or less than about 13 mol %, or less than about 12 mol %, or less than about 11 mol %, or less than about 10 mol %, or from about 5 to 8 mol %, about 5 to 10 mol %, about 5 to 12 mol %, or about 5 to 14 mol %, along with relatively low concentrations of $H_2S$ and heavier hydrocarbons.

As shown in FIG. 1, the feed gas 102 may enter a precooler 104. Within the precooler 104, the temperature of the feed gas 102 may be lowered to a temperature of about −60° F. (−51.1° C.) to give a cooled feed gas 106. In one or more embodiments, the precooler 104 may be an indirect heat exchanger, where the cooled feed gas 106 may be expanded through a Joule-Thompson (J-T) valve, for example. The cooled feed gas 106 may be fed to a refrigeration system such as a chiller 108 for additional cooling and refrigeration. A chilled feed gas 110 may emerge from the chiller 108 and may be introduced into a column 112.

The column 112 may be a distillation column for the condensation, separation, and removal of a $CO_2$-rich liquid from the feed gas 102. In embodiments, the column 112 may be a cryogenic distillation column where a $CO_2$ acid gas component may be separated from the chilled feed gas 110 by a cryogenic process including the controlled freezing and melting of $CO_2$ without the use of freeze-suppression additives.

Within the column 112, the chilled feed gas 110 may be stripped and removed of $CO_2$ and other contaminants to produce a vapor 114, which may exit overhead or a top outlet of the column 112. The vapor 114 may primarily include $CH_4$. The vapor 114 may proceed to a heat exchanger 116 to be cooled to form a condensed liquid (e.g., for reflux) and a vapor $CH_4$ product, e.g., a clean sales gas. Thus, in embodiments, the heat exchanger 116 is a partial condenser. While product sales gas may be collected directly from the heat exchanger 116, the embodiment illustrated in FIG. 1 depicts a partially-condensed stream 118 discharging from the heat exchanger 116 and entering a vessel 120 (e.g., accumulator or reflux drum). The vapor $CH_4$ product may exit the vessel 120 as a sales gas 122 for subsequent sale, or as a feed to a liquid natural gas (LNG) plant, and the like. A liquid 124 may be returned as reflux to the column 112 from the vessel 120. In the column 112, the $CO_2$ and other contaminants removed from the chilled feed gas 110 may embody a liquid 126 that may exit a bottom outlet of the column 112 as liquid bottoms and may include primarily $CO_2$ along with other contaminants.

Figure 2:
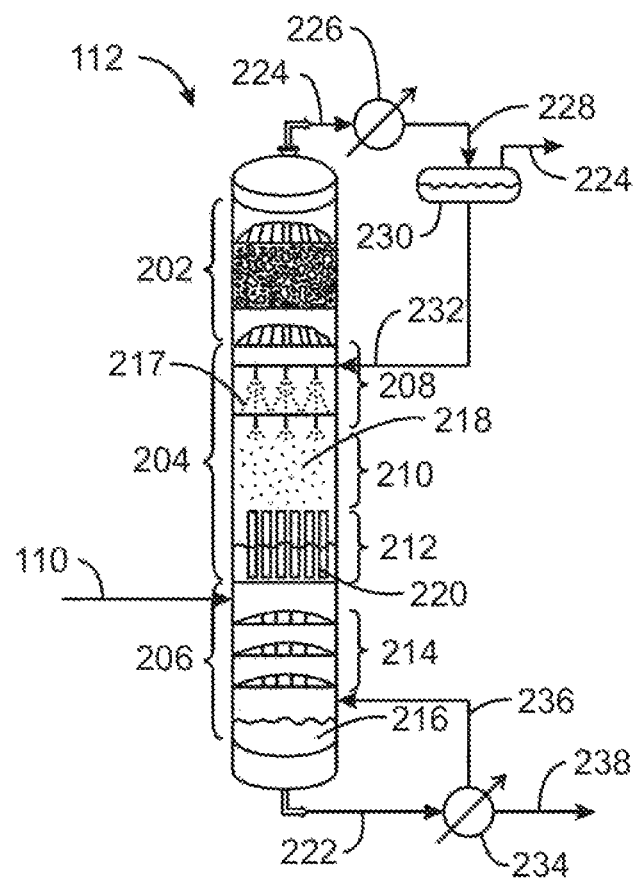
FIG. 2 is a drawing of a cryogenic distillation column system configured to receive a feed gas having relatively high $CO_2$ content.

FIG. 2 is a drawing of a cryogenic distillation column system 200 configured to receive a feed having relatively high $CO_2$ content. Like numbers are as described with respect to FIG. 1. As shown in FIG. 2, a column 112 may be a cryogenic distillation column 112 with an associated reboiler and overhead partial condenser, as will be later discussed in detail. In the illustrated embodiment, the column 112 may include three separate sections, such as an upper distillation section or "rectification section" 202, a middle distillation section or "controlled freeze zone" 204, and a lower distillation section or "stripping section" 206. The controlled freeze zone 204 may include a spray nozzle bank 208, a freeze zone 210, and a melt tray 212.

A chilled two-phase fluid 110, e.g., liquid/vapor phase fluid, may be introduced into the stripping section 206 where the two-phase fluid 110 may include a $CO_2$ concentration and a $CH_4$ concentration, among other heavier hydrocarbons and contaminants. Within the stripping section 206, the two-phase fluid 110 may be separated into its liquid and vapor components. If solids are anticipated, the solids may be separated prior to entering the stripping section 206 of the column 112. The conventional process may include feeding a dry feed gas or a liquid/slurry mixture into the stripping section 206.

Within the stripping section 206, the liquid component may collect on the series of trays 214 and flow into a bottom portion of the stripping section 206 to form a liquid pool 216. The liquid component may primarily include the liquid $CO_2$ and dissolved $H_2S$. The vapor component may leave the stripping section 206 and proceed upward into risers in the melt tray 212. As the vapor component continues upward, it may enter the controlled freeze zone 204. The risers of the melt tray 212 may act as a vapor distributor for uniform distribution through the controlled freeze zone 204. As it continues to rise upward into the controlled freeze zone 204, the vapor component may contact a spray of cold liquid 217 emitted by the spray nozzle bank 208. When in contact with the spray of cold liquid 217, a portion of the $CO_2$ in the vapor component may solidify within the controlled freeze zone 204. This may act to remove or "freeze out" the $CO_2$ contaminant within the vapor component. The solidified $CO_2$ 218 may fall onto the melt tray 212 where it may be heated to form a liquid 220 that may be collected on the melt tray 212. The liquid $CO_2$ 220 may then flow into the stripping section 206 and into the liquid pool 216, which primarily includes liquid $CO_2$. The liquid $CO_2$ 216/220 may exit the stripping section 206 as a sour liquid 222.

With contaminants removed, the vapor component may continue to flow upward and into the rectification section 202, along with other light gases. The vapor component may include a sweet gas 224, such as methane, $CH_4$, that may exit overhead of the column 112. The sweet gas 224 may be commercialized or used as an on-site fuel gas. It should be noted that a portion of the sweet gas 224 may be condensed in a heat exchanger 226 to form a partially-condensed stream 228. The partially-condensed stream 228 may enter a reflux drum 230 where a reflux stream, e.g., liquid condensate 232, may be collected and recycled back into the column 112. The liquid condensate 232 may re-enter the column 112 in the form of the spray of cold liquid 217.

Similarly, a portion of the sour liquid 222 exiting the stripping section 206 may be heated in a reboiler 234 and returned to the liquid pool 216 as a reboiler stream, e.g., vapor stream 236. The vapor stream 236 may provide energy to the bottom of the cryogenic distillation column 112 to boil off methane and other light components that may be dissolved in the sour liquid 222. A residual reboiled liquid, e.g., a bottoms product 238, may exit the reboiler 234.

With most distillation-type columns, a raw feed stream may enter a section of a column that has a concentration similar to that of a concentration of species already within the column. For example, in a cryogenic column, a raw feed stream directed into a stripping section may contain a relatively high concentration of $CO_2$, e.g., at least about 16 mol % or higher, that may match the concentration of the species, e.g., at least about 16 mol % or higher, already within the cryogenic column. In particular, the stripping section may be located below a melt tray, where the melt tray is located in a controlled freeze zone of the column. However, if a raw feed stream with a lower $CO_2$ concentration, such as less than 16 mol %, or from about 5 mol % to 15 mol %, is injected into the stripping section of the cryogenic column, the lower $CO_2$ concentration stream may re-vaporize. This re-vaporization may occur in order to match the temperature already within the stripping section, for example, as will be discussed with respect to FIG. 5. To compensate for this effect, the raw feed stream with the lower $CO_2$ concentration may need to enter the column at a colder temperature than a raw feed stream with a higher $CO_2$ concentration. In doing so, extra energy may be expended to remove this additional heat at increased costs. To reduce system power requirements, the present disclosure provides injecting the low-$CO_2$ raw feed stream into the controlled freeze zone, which may contain a $CO_2$ concentration similar to that of the raw feed stream.

Figure 3:
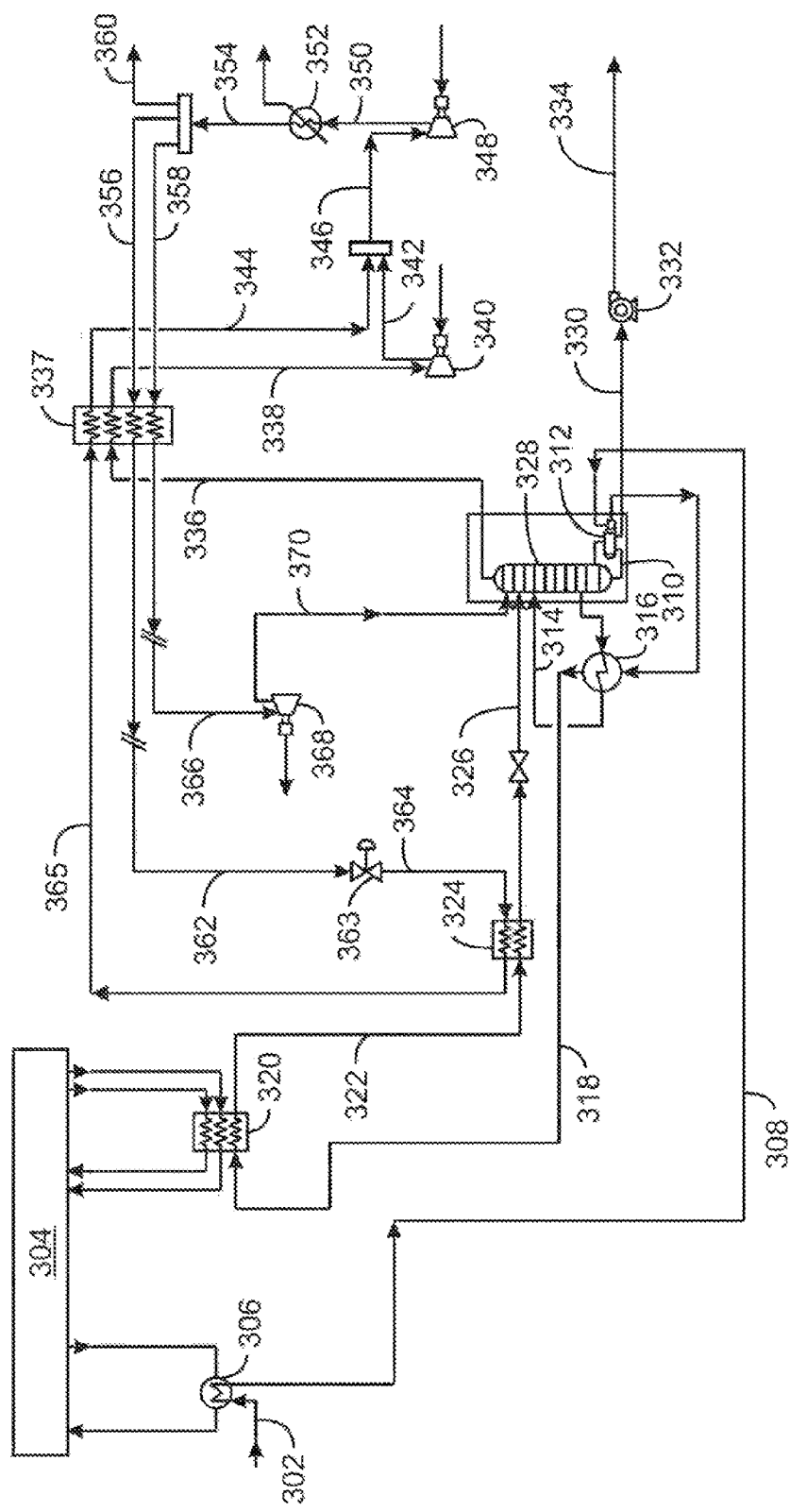
FIG. 3 is a simplified process flow diagram of a system for feeding a feed gas above a melt tray and into a controlled freeze zone section of a column.

FIG. 3 is a simplified process flow diagram 300 of a system for feeding a feed gas above a melt tray and into a controlled freeze zone section of a column. As shown in FIG. 3, a raw feed stream 302 may be initially precooled against a refrigerant 304 to a temperature of about 50° F. (10° C.) to 65° F. (18.3° C.) in a feed precooler 306. The raw feed stream 302 may contain $CH_4$, $CO_2$, along with $H_2S$ and other heavier hydrocarbons. The raw feed stream 302 is a low-$CO_2$ concentration feed stream, and may have a $CO_2$ concentration of less than about 16 mol %, or less than 15 about mol %, or less than about 14 mol %, or less than about 13 mol %, or less than about 12 mol %, or less than about 11 mol %, or less than about 10 mol %, or from about 5 to 8 mol %, about 5 to 10 mol %, about 5 to 12 mol %, or about 5 to 14 mol %.

After precooling, the pre-cooled feed stream 308 may be further cooled by cross-exchange with stream 310 in reboiler 312 and further cooled by cross-exchange with stream 314 in side-reboiler 316 to form a cooled feed stream 318. The cooled feed stream 318 may enter a first feed chiller 320 where it may be chilled to a temperature of about −30° F. (−34° C.) to about −50° F. (−45.6° C.), such as about −40° F. (−40° C.), against the lowest stages of the refrigerant 304 to form chilled feed stream 322. The chilled feed stream 322 may be further chilled via a second feed chiller 324 to a temperature of about −80° F. (−62.2° C.) to about −90° F. (−67.8° C.), such as −83° F. (−64.9° C.), or as low a temperature as possible so as to not form solid $CO_2$. A chilled feed stream 326 may enter a controlled freeze zone of a column 328 where it may undergo separation and purification techniques.

If in a vapor form, the chilled feed stream 326 may be contacted by a spray of cold liquid within the controlled freeze zone of the column 328. The $CO_2$ concentration within the chilled feed stream 326 may freeze to produce solid $CO_2$ that falls onto a melt tray. As described above, the melt tray may act to melt the solid $CO_2$ to form a liquid stream 330 that may exit a bottom outlet of the column 328. The liquid stream 330 may include primarily a $CO_2$ concentration, along with other contaminants, such as $H_2S$ and heavier hydrocarbons. The liquid stream 330 may be disposed of in a number of ways. For example, the liquid stream 330 may be pumped via pump 332 to a disposal well (AGI) as a $CO_2$-rich liquid 334. In other embodiments, the $CO_2$-rich liquid stream 334 may be marketed, for example, for use in enhanced oil recovery.

After at least a portion of the $CO_2$ has been removed from the chilled feed stream 326 within the controlled freeze zone, a vapor stream 336 may continue upward through the column 328. The vapor stream 336 may primarily include a $CH_4$ vapor, for example, at a $CH_4$ concentration of 97 mol % or higher.

The vapor stream 336 may enter a reflux exchanger 337 where it may be heated to a temperature of from about −140° F. (−95.5° C.) to about 50° F. (10° C.), such as from about −134° F. (−92.2° C.) to about 43.8° F. (6.6° C.), to form a heated vapor stream 338 and later fed to a low-pressure compressor 340. The low-pressure compressor 340 increases the pressure of the heated vapor stream 338 from a pressure of from about 400 psia to 500 psia, such as about 465 psia, to a pressure of from about 1,000 psia to about 1,100 psia, such as about 1,065 psia, to form a compressed vapor stream 342. A $CH_4$ refrigerant stream 344 may also be heated by the reflux exchanger 337 and may have a pressure similar to the compressed vapor stream 342. Thus, both streams, 342 and 344, may be combined to produce a consolidated gas stream 346 that may be fed into a high-pressure compressor 348 at a pressure of about 1,000 psia to about 1,100 psia, such as about 1,065 psia, and a temperature of about 150° F. (65.6° C.) to about 160° F. (71.1° C.), such as about 156.6° F. (69.2° C.), for example, to feed a sales gas pipeline. In operation, the pressure of the $CH_4$ refrigerant 344 may be sufficient as is and thus, may bypass the low-pressure compressor 340 and go directly to the high-pressure compressor 348, which may conserve compression power.

The consolidated gas stream 346 may be compressed to provide a compressed consolidated gas 350 at a pressure of about 1,500 psia to about 1,600 psia, such as about 1,525 psia, and a temperature of about 200° F. (93.3° C.) to about 250° F. (121.1° C.), such as 218° F. (103.3° C.). The compressed consolidated gas 350 may thereafter be cooled by a heat exchanger 352 to produce a cooled consolidated gas 354 as a final product stream. The cooled consolidated gas 354 may be split into three separate streams, 356, 358, 360, where each stream may include a $CH_4$ concentration of about 97 mol % and a $CO_2$ concentration of about 1.5 mol % or less and where the remaining concentration may include $H_2S$, heavier hydrocarbons, nitrogen, among other impurities. The first stream 356 may be initially fed into the reflux exchanger 337 to produce a cooled first stream 362, which may be expanded through a J-T valve 363 to form a chilled first stream 364. The chilled first stream 364 may be warmed in the second feed chiller 324 to cool feed stream 322 and to produce the $CH_4$ refrigerant stream 365. The second stream 358 may cooled in the reflux exchanger 337 to produce a cooled second stream 366 and further cooled by a reflux expander 368 to produce a reflux stream 370 that re-enters the column 328. The third stream 360 may be a final clean sales gas that may be utilized for commercial usage.

Exemplary process parameters for the various streams with respect to FIG. 3 are provided in Table I. When a raw feed stream 326 with a lower $CO_2$ concentration is injected into the column 328 at a position above a melt tray and into a controlled freeze zone, the raw feed stream 326 may undergo additional refrigeration via the second feed chiller 324 so that the total required compression power may be about 40,880 horsepower (hp).

TABLE I

Exemplary Process Parameters for Injection of Raw Feed Stream Above Melt Tray

| | Stream Number | | | | | | | | | | |
|---|---|---|---|---|---|---|---|---|---|---|---|
| | 302 | 308 | 318 | 322 | 326 | 370 | 330 | 336 | 338 | 342 | 344 |
| Temp - Deg F. | 94.9 | 60.0 | 18.5 | −40.0 | −84.3 | −145.0 | 22.1 | −134.0 | 43.8 | 156.6 | 43.8 |
| Pressure - psia | 510.0 | 500.0 | 495.0 | 490.0 | 475.0 | 475.0 | 475.0 | 470.0 | 465.0 | 1065.0 | 1065.0 |
| Flowrate (MMSCFD) | 324.9 | 324.9 | 324.9 | 324.9 | 324.9 | 204.5 | 23.6 | 505.8 | 505.8 | 505.8 | 82.3 |
| Methane Mole Percent | 90.40% | 90.40% | 90.40% | 90.40% | 90.40% | 97.47% | 0.20% | 97.47% | 97.47% | 97.47% | 97.47% |
| Ethane Mole Percent | 0.71% | 0.71% | 0.71% | 0.71% | 0.71% | 0.07% | 8.88% | 0.07% | 0.07% | 0.07% | 0.07% |
| $CO_2$ Mole Percent | 8.00% | 8.00% | 8.00% | 8.00% | 8.00% | 1.50% | 90.92% | 1.50% | 1.50% | 1.50% | 1.50% |
| Nitrogen Mole Percent | 0.89% | 0.89% | 0.89% | 0.89% | 0.89% | 0.96% | 0.00% | 0.96% | 0.96% | 0.96% | 0.96% |

| | Stream Number | | | | | | | | | | |
|---|---|---|---|---|---|---|---|---|---|---|---|
| | 346 | 350 | 354 | 356 | 358 | 362 | 366 | 364 | 365 | 360 | 334 |
| Temp - Deg F. | 156.6 | 218.7 | 105.0 | 105.0 | 105.0 | −106.3 | −129.0 | −113.0 | −45.0 | 105.0 | 45.9 |
| Pressure - psia | 1065.0 | 1525.0 | 1515.0 | 1515.0 | 1515.0 | 1510.0 | 1510.0 | 1075.0 | 1070.0 | 1515.0 | 2200.0 |
| Flowrate (MMSCFD) | 588.1 | 588.1 | 588.1 | 82.3 | 204.5 | 82.3 | 204.5 | 82.3 | 82.3 | 301.2 | 23.6 |
| Methane Mole Percent | 97.47% | 97.47% | 97.47% | 97.47% | 97.47% | 97.47% | 97.47% | 97.47% | 97.47% | 97.47% | 0.20% |
| Ethane Mole Percent | 0.07% | 0.07% | 0.07% | 0.07% | 0.07% | 0.07% | 0.07% | 0.07% | 0.07% | 0.07% | 8.88% |
| $CO_2$ Mole Percent | 1.50% | 1.50% | 1.50% | 1.50% | 1.50% | 1.50% | 1.50% | 1.50% | 1.50% | 1.50% | 90.92% |
| Nitrogen Mole Percent | 0.96% | 0.96% | 0.96% | 0.96% | 0.96% | 0.96% | 0.96% | 0.96% | 0.96% | 0.96% | 0.00% |

Figure 4:
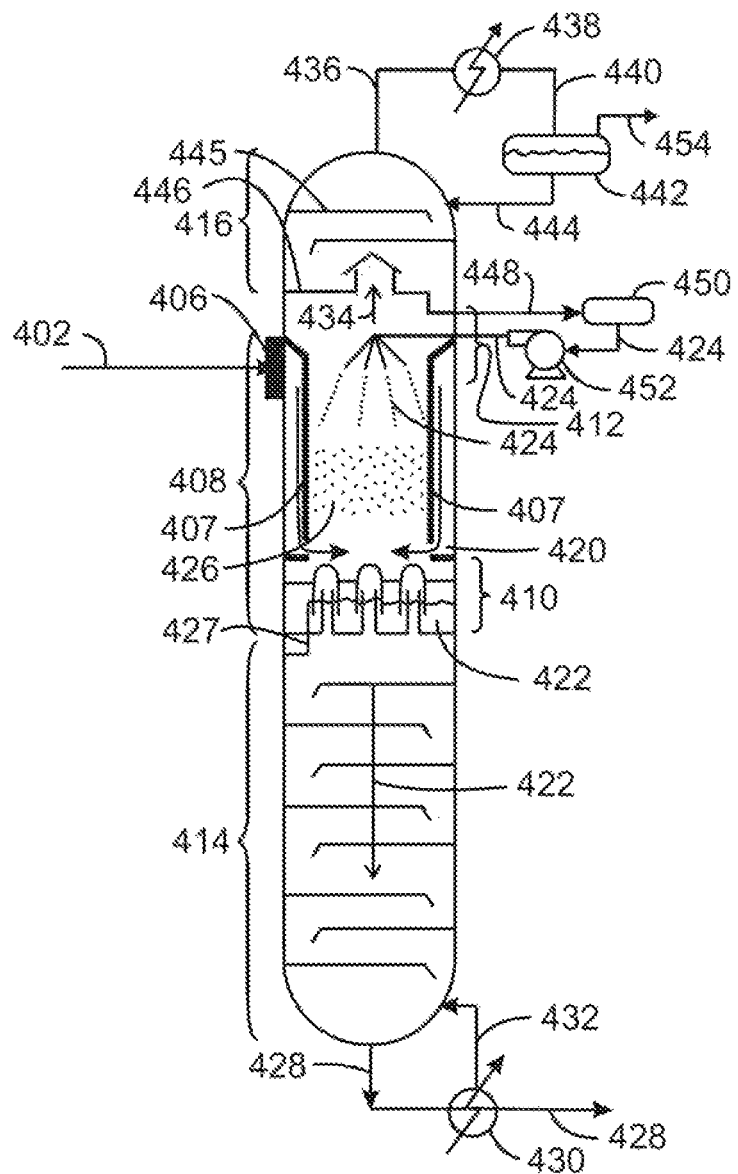
FIG. 4 is a drawing of feeding a low-$CO_2$ content feed gas into a controlled freeze zone section of a column as depicted in FIG. 3.

FIG. 4 is a drawing of feeding a low-$CO_2$ content feed gas into a controlled freeze zone section of a column 400, such as column 328 depicted in FIG. 3. In addition to a $CO_2$ concentration, a low-$CO_2$ feed stream 402 may include $CH_4$, other lighter hydrocarbons, and other contaminants, such as $H_2S$. The low-$CO_2$ feed stream 402 may have a $CO_2$ concentration of less than about 16 mol %, or less than about 15 mol %, or less than about 14 mol %, or less than about 13 mol %, or less than about 12 mol %, or less than about 11 mol %, or less than about 10 mol %, or from about 5 to 8 mol %, about 5 to 10 mol %, about 5 to 12 mol %, or about 5 to 14 mol %. In one or more embodiments, the low-$CO_2$ feed stream 402 may be a two-phase vapor-liquid stream or a dry feed gas.

As shown in FIG. 4, the low-$CO_2$ feed stream 402 may be injected into a column 400 via a raw feed nozzle 406 into an internal annular sleeve 407. The raw feed nozzle 406 may be located in a controlled freeze zone 408 so that the low-$CO_2$ feed stream 402 may enter the column 400 above a melt tray 410 and within a spray nozzle section 412. In one or more embodiments, the feed stream 402 may enter the column 400 above the melt tray 410 and above the spray nozzle section 412. This may be in contrast to conventional configurations where the raw feed nozzle 406 may be located below both the melt tray 410 and in a lower stripping section 414. The column 400 may also include a rectification section 416 located above the controlled freeze zone 408.

The internal annular sleeve 407 may be positioned around a periphery of the controlled freeze zone 408 and a top portion of the internal annular sleeve 407 may be closed off against the wall of column 400. In one or more embodiments, the internal annular sleeve 407 may be positioned around the entire periphery of the control freeze zone 408 or may be located within one or more quadrants related to the periphery of the controlled freeze zone 408. The low-$CO_2$ feed stream 402 may enter the column 400 and into the internal annular sleeve 407 so that the incoming low-$CO_2$ feed stream 402 may be channeled around the periphery and down toward the melt tray 410. By flowing the low-$CO_2$ feed stream 402 into the internal annular sleeve 407, the walls of the column 400 may be warmed, while the low-$CO_2$ feed stream 402 is chilled to the temperature of the column 400. In operation, this may mitigate the accumulation of solid $CO_2$ upon the walls of the column 400, thus preventing possible $CO_2$ plugging of the column 400. The bottom portion of the internal annular sleeve 407 may include a slot 420 located proximate a liquid level 422, e.g., a $CO_2$ rich-liquid 422, on the melt tray 410, where the slot 420 may project the low-$CO_2$ feed stream 402 inward and towards the center of the controlled freeze zone 408. The internal annular sleeve 407 may be generally cylindrical, generally inverted frusto-conical, generally funnel-shape, or generally tapered, among other shapes. The internal annular sleeve 407 may extend downwards from substantially the top of the control freeze zone 408, substantially from the middle of the control freeze zone 408, or substantially from the bottom of the control freeze zone 408. The internal annular sleeve 407 may terminate substantially in a middle portion of the control freeze zone 408, substantially in a lower portion of the control freeze zone 408, in close proximity to a top portion of the melt tray 410, substantially within an internal section of the melt tray 410, among others.

As the low-$CO_2$ feed stream 402 enters the controlled freeze zone 408, it may travel downward along the periphery of the walls of the column 400. The low-$CO_2$ feed stream 402 may be contacted by a cold liquid spray 424 from the spray nozzle section 412. In one or more embodiments, the spray nozzle section 412 may direct the cold liquid spray 424 inside of the internal annular sleeve 407, into a center of the control freeze zone 408, or a combination of both thereof. The $CO_2$ concentration in the low-$CO_2$ feed stream 402 may solidify upon contacting the cold liquid spray 424 to form solid $CO_2$ 426. The solid $CO_2$ 426 may fall and collect on the melt tray 410 where it may melt to form the $CO_2$ rich-liquid 422. The $CO_2$ rich-liquid 422 may flow through a downcomer 427 proximate to the melt tray 410 and into the stripping section 414 to provide a bottoms stream 428. A portion of the bottoms stream 428 may be heated by a heat exchanger 430 and may re-enter the column 400 in the lower portion of the stripping section 414 as a reboiler stream 432. The remainder of the bottoms stream 428 may exit the column 400 and may be used for enhanced oil recovery processes or re-injected into an acid-gas well (AGI).

In the freeze zone 408, $CO_2$ and other contaminants are removed from the low-$CO_2$ feed stream 402, leaving a vapor 434 that rises upwards into the rectification section 416 of the column. The vapor 434 primarily includes $CH_4$, but may have small amounts of $CO_2$ and other contaminants. An overhead vapor stream 436 may exit the column 400 and may enter a heat exchanger 438 to be chilled to produce a chilled hydrocarbon vapor and liquid stream 440. The chilled hydrocarbon stream 440 may be directed into a reflux vessel 442 to be separated into liquid and gas phases. The liquid phase, as a reflux stream 444, may be returned to the column 400, for example, into the rectification section 416. In the rectification section 416, the reflux stream 444 may also be used to remove additional contaminants by sweeping them down into the column 400.

The reflux stream 444 may flow downward through a series of mass transfer devices 445 and collect on a collector tray 446. In one or more embodiments, the mass transfer devices 445 may include trays with cascading weirs and downcomers, as shown in FIG. 4. Alternatively, the mass transfer devices may comprise random packing or structured packing. The liquid collected on the collector tray 446 may be drawn out of the rectification section 416 as a liquid stream 448, which may flow into a reflux drum 450 from which the aforementioned cold liquid spray 424 may be drawn. Upon exiting the reflux drum 450, the cold liquid spray 424 is pressurized in a pump 452 for reintroduction into the column 400 to aid in solidifying the $CO_2$ in the low-$CO_2$ feed stream 402.

A portion of the chilled hydrocarbon vapor stream 436 that may not have condensed but remained in the vapor phase may exit the reflux vessel 442 as a final product stream 454. The final product stream 454 may include lighter hydrocarbons gases, primarily $CH_4$, that may be ultimately sold commercially. In one or more embodiments, the final product stream 454 may also include a concentration of ethane, nitrogen, $CO_2$, and helium.

In one or more embodiments, the low-$CO_2$ feed stream 402, as shown in FIG. 4, may include a $H_2S$ concentration. The concentration of the $H_2S$ may encompass a low range of less than about 8%, or from about 5% to about 8%. Any $H_2S$ present may have a slight preference towards being in a liquid form versus a gas form at particular processing temperatures. For example, if a larger volume of cold spray liquid 424 contacts the low-$CO_2$ feed stream 402, including the $H_2S$ concentration, the column 400 may drive the $H_2S$ concentration downward to within a parts-per-million (ppm) limit, such as a 4 ppm limit. As the $H_2S$ concentration comes into contact with the cold spray liquid 424, the $H_2S$ can be pulled out of the low-$CO_2$ feed stream 402 as $H_2S$ liquid.

The liquid $H_2S$ may flow downward through the controlled freeze zone 408 and collect on the melt tray 410 along with the $CO_2$ rich-liquid 422. A mixture of $CO_2/H_2S$ liquid may flow downward into the stripping section 414 where it may ultimately exit the column 400 as a part of a $CO_2$-rich liquid bottoms stream 428 with a $H_2S$ concentration.

Figure 5:
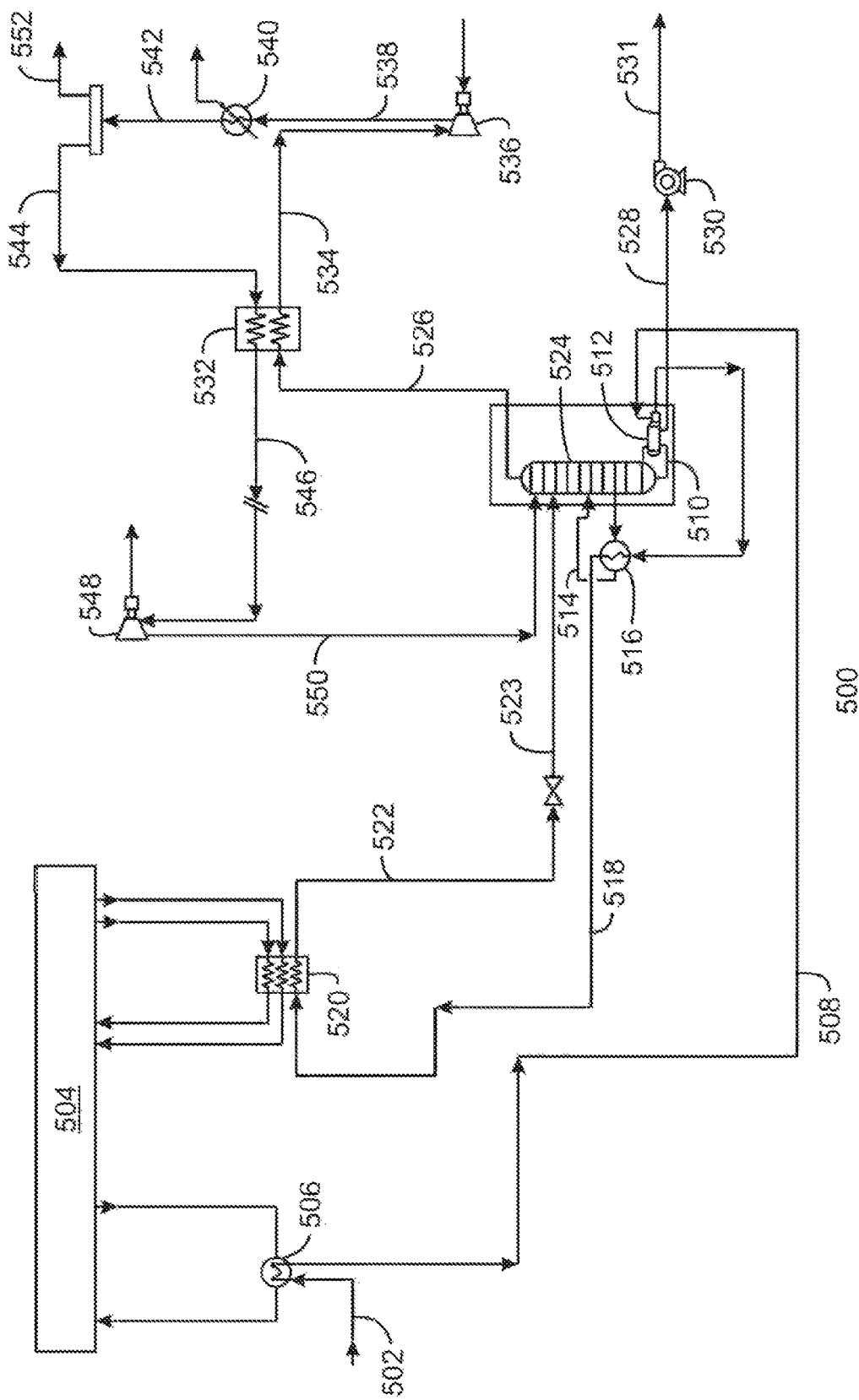
FIG. 5 is a simplified process flow diagram of a system for feeding a feed gas below a melt tray and into a stripping section of a column.

FIG. 5 is a simplified process flow diagram 500 of a system for feeding a feed gas below a melt tray and into a stripping section of a column. With most distillation-type columns, a raw feed stream may enter a section of a column that has a concentration similar to that of a concentration of species already within the column. For example, in a cryogenic column, the raw feed stream directed into a stripping section of a column may contain a high concentration of $CO_2$ (e.g., at least about 16% or higher) that may match the concentration of the species (e.g., at least about 16% or higher) already within the cryogenic column. However, if a raw feed stream with a lower $CO_2$ concentration (e.g., at least about 5% to 16%) is injected into a stripping section of the cryogenic column, the lower $CO_2$ concentration gas may pass through the melt tray to match the $CO_2$ concentration in the spray section, as will be described with respect to FIG. 5. Thus, as shown in FIG. 5, a low-$CO_2$ feed stream 502 that is fed below a melt tray may be cooled once by a single feed chiller, as described above with respect to FIG. 3. In operation, the warmer low-$CO_2$ feed stream 502 does not require the use of a second feed chiller, as depicted in FIG. 3. However, while the warmer low-$CO_2$ feed stream 502 prevents the adherence of solid $CO_2$ on the walls of a column and a melt tray, the load on the cryogenic column may be increased. In particular, the incremental heat load can be removed via the cryogenic column, which may increase the net power requirement of the cryogenic column.

As shown in FIG. 5, the low-$CO_2$ feed stream 502 may be initially precooled against a refrigerant 504 in a feed precooler 506. The low-$CO_2$ feed stream 502 may contain $CH_4$, $CO_2$, along with $H_2S$ and other heavier hydrocarbons. With respect to FIG. 5, the concentration of $CO_2$ in the low-$CO_2$ feed stream 502 may be less than about 16 mol %, or less than 15 about mol %, or less than about 14 mol %, or less than about 13 mol %, or less than about 12 mol %, or less than about 11 mol %, or less than about 10 mol %, or from about 5 to 8 mol %, about 5 to 10 mol %, about 5 to 12 mol %, or about 5 to 14 mol %.

After precooling, a pre-cooled feed stream 508 may be generated to heat a cooling loop 510 for a reboiler 512 and a cooling loop 514 for a side-reboiler 516, while being further cooled to form a cooled feed stream 518. The cooled feed stream 518 may enter a feed chiller 520 where it may be cooled to $-30°$ F. ($-34.4°$ C.) to form a cooled feed stream 522. The pressure of the cooled feed stream 522 may be lowered to provide a colder, low-pressure feed 523. The low-pressure cooled feed 523 may enter a column 524 where it may undergo separation techniques to recover the $CH_4$ from the low-$CO_2$ feed stream 502 to generate purified $CH_4$.

Since the low-$CO_2$ feed stream 502 includes a low-$CO_2$ concentration (e.g., 5 to 8%) that may be injected into a section, e.g., stripping section, of the column 524 that may normally have a $CO_2$ concentration above 16%, the feed stream 502 may try to compensate for the concentration deficiency by fully vaporizing. Thus, any $CO_2$-rich liquid in the low-$CO_2$ feed stream 502 may re-vaporize to chill the $CO_2$-rich fluids in the stripper and to increase the $CO_2$ vapor concentration (e.g. to about 16% or greater). It is preferred to more closely match the feed temperature to the normal temperature at that location in the distillation column. Therefore, the second feed chiller 324, as described with respect to FIG. 3, may not be included with respect to FIG. 5. Thus, the low-$CO_2$ feed stream 502 that may enter the column may be warmer, e.g., $-31.4°$ F. ($-35.2°$ C.), than the low-$CO_2$ feed stream 302 of FIG. 3, e.g., $-84.3°$ F. ($-64.6°$ C.).

Within the column 524, the low-pressure cooled feed 523 may separate to provide a vapor stream 526 and a liquid acid gas stream 528. The vapor stream 526 may include a $CH_4$ concentration of 97% or higher so as to include primarily $CH_4$ vapor. The liquid acid gas stream 528 may include $CO_2$, along with other contaminants such as $H_2S$ and heavier hydrocarbon components. The liquid acid gas stream 528 may be pumped via pump 530 to a reinjection pressure for later disposal as a $CO_2$ liquid 531.

The vapor stream 526 may enter an overhead exchanger 532 where it may be heated to a temperature of from about $-140°$ F. ($-95.5°$ C.) to about $50°$ F. ($-45.6°$ C.), such as from about $-133°$ F. ($-91.7°$ C.) to about $49.5°$ F. ($9.7°$ C.), form heated vapor stream 534 at a pressure of from about 400 psia to 500 psia, such as about 465 psia. The heated vapor stream 534 may be fed to a sales gas compressor 536 to increase its pressure to a pressure of from about 1500 psia to about 1600 psia, such as about 1525 psia, to form a compressed vapor stream 538 at a temperature of about $200°$ F. ($93.3°$ C.) to about $275°$ F. ($135°$ C.), such as about $245°$ F. ($118.3°$ C.). The compressed vapor stream 538 may flow into a heat exchanger 540 where it may be cooled to a temperature of from about $90°$ F. ($32.2°$ C.) to about $120°$ F. ($48.9°$ C.), such as about $105°$ F. ($40.6°$ C.). A cooled vapor stream 542 may exit the heat exchanger 540 and may be split into two streams. In one or more embodiments, the number of streams that the cooled vapor stream 542 may be split into may vary depending on usage and need. Each stream may include a $CH_4$ concentration of about 97% and a $CO_2$ concentration of about 1.5% or less where the remaining concentration may include heavier hydrocarbons such as ethane ($C_2H_6$) concentration and nitrogen gas. A first stream 544 may be initially fed into the overhead exchanger 532 to form a cooled stream 546. The cooled stream 546 may flow into a reflux expander 548 to generate a cooled reflux stream 550 that may be fed into back into the column 524. A second stream 552 may be a final clean sales gas that may be utilized for commercial usage.

Exemplary process parameters for the various streams with respect to FIG. 5 are provided in Table II. By feeding the low-pressure, cooled feed 523, which contains a low-$CO_2$ concentration, into the lower stripping section of the column 524 at a warmer temperature, extra energy may be needed to remove the additional heat. Additionally, with less cooling of the low-$CO_2$ feed stream 502, extra cooling may be supplied via the overhead exchanger 532. As stated above, the total required compression power for FIG. 3 may be about 40,800 horsepower (hp). However, due to the additional energy needed to remove the additional heat, the total required compression power with respect to FIG. 5 may be about 44,900 hp. Thus, to conserve energy and limit cost, it may be appropriate to inject a low-$CO_2$ raw feed stream into an area of a column that may match the $CO_2$ concentration and temperature of the species previously existing in the column, as discussed with respect to FIG. 3 and FIG. 4.

TABLE II

Exemplary Process Parameters for Injection of Raw Feed Stream Below a Melt Tray

|  | 502 | 508 | 518 | 522 | 523 | 550 | 528 | 526 |
|---|---|---|---|---|---|---|---|---|
| Temperature - Deg F. | 94.9 | 63.4 | 8.3 | −30.0 | −31.4 | −144.7 | 22.6 | −133.7 |
| Pressure - psia | 510.0 | 500.0 | 495.0 | 490.0 | 475.0 | 475.0 | 475.0 | 470.0 |
| Flowrate (MMSCFD) | 324.9 | 324.9 | 324.9 | 324.9 | 324.9 | 319.0 | 23.4 | 620.4 |
| Methane Mole Percent | 90.40% | 90.40% | 90.40% | 90.40% | 90.40% | 97.41% | 0.14% | 97.41% |
| Ethane Mole Percent | 0.71% | 0.71% | 0.71% | 0.71% | 0.71% | 0.13% | 8.16% | 0.13% |
| CO2 Mole Percent | 8.00% | 8.00% | 8.00% | 8.00% | 8.00% | 1.50% | 91.70% | 1.50% |
| Nitrogen Mole Percent | 0.89% | 0.89% | 0.89% | 0.89% | 0.89% | 0.96% | 0.00% | 0.96% |

|  | 534 | 538 | 542 | 544 | 546 | 552 | 531 |
|---|---|---|---|---|---|---|---|
| Temperature - Deg F. | 49.5 | 245.3 | 105.0 | 105.0 | −128.7 | 105.0 | 46.4 |
| Pressure - psia | 465.0 | 1525.0 | 1515.0 | 1515.0 | 1510.0 | 1515.0 | 2200.0 |
| Flowrate (MMSCFD) | 620.4 | 620.4 | 620.4 | 319.0 | 319.0 | 301.4 | 23.4 |
| Methane Mole Percent | 97.41% | 97.41% | 97.41% | 97.41% | 97.41% | 97.41% | 0.14% |
| Ethane Mole Percent | 0.13% | 0.13% | 0.13% | 0.13% | 0.13% | 0.13% | 8.16% |
| CO2 Mole Percent | 1.50% | 1.50% | 1.50% | 1.50% | 1.50% | 1.50% | 91.70% |
| Nitrogen Mole Percent | 0.96% | 0.96% | 0.96% | 0.96% | 0.96% | 0.96% | 0.00% |

Figure 6:
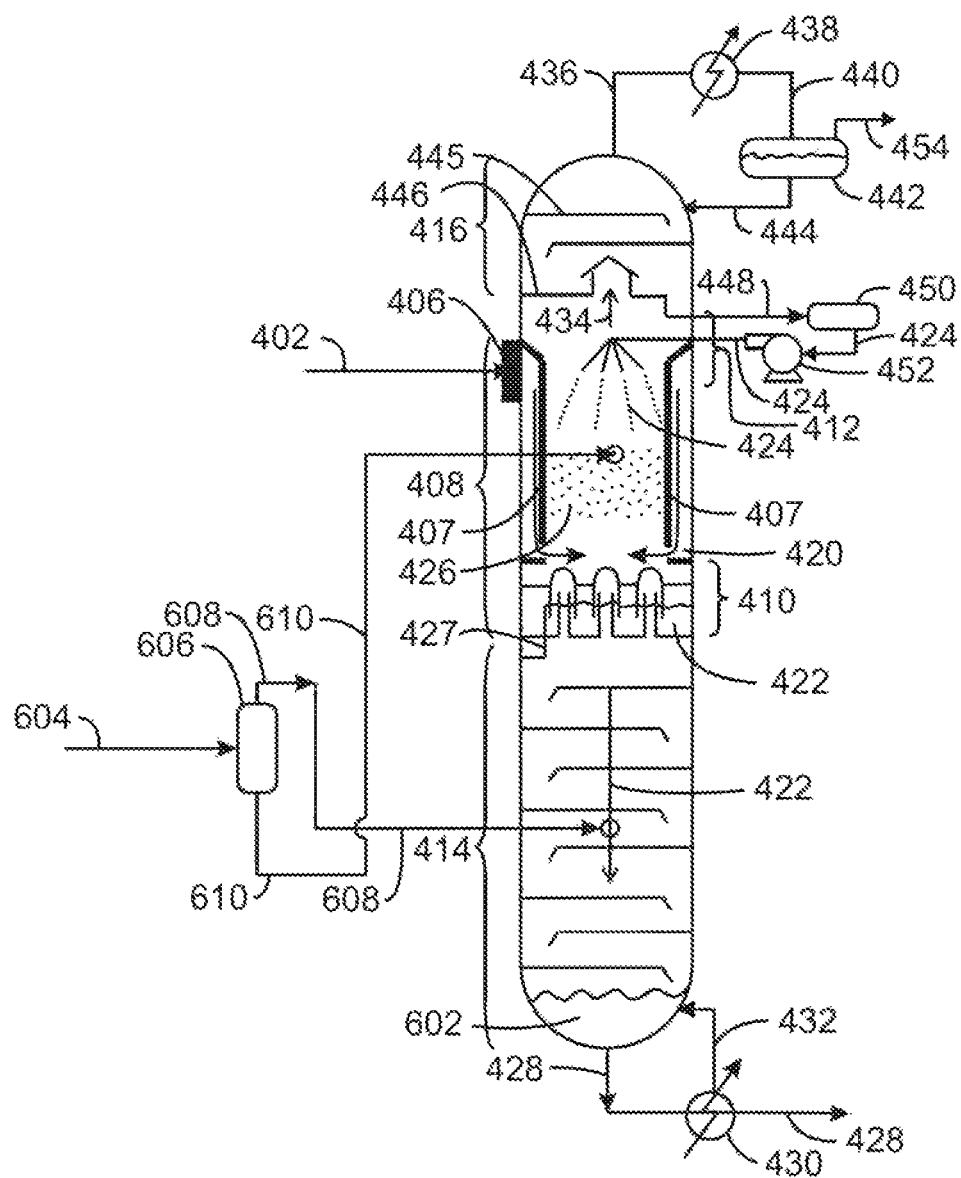
FIG. 6 is a drawing of feeding a low-$CO_2$ content feed gas into a controlled freeze zone section of a column and a feeding a low-$CO_2$ content feed gas below the controlled freeze zone section of the column.

FIG. 6 is a drawing of feeding a low-$CO_2$ content feed gas into a controlled freeze zone section of a column 600 and feeding a low-$CO_2$ content feed gas below the controlled freeze zone section of the column. Like numbers are as described with respect to FIG. 4. The low-$CO_2$ feed stream 402 and the low-$CO_2$ feed stream 604 may include $CH_4$, other light hydrocarbons, and certain contaminants including $CO_2$.

The low-$CO_2$ feed stream 402 may be injected into the column 600 via a raw feed nozzle 406 as a vapor. In one or more embodiments, the low-$CO_2$ feed stream 402 may be a vapor-liquid fluid or a vapor-liquid-solid slurry. As described above with respect to FIG. 4, the low-$CO_2$ feed 402 may flow into an internal annular sleeve 407 so that the incoming low-$CO_2$ feed stream 402 may be channeled around the periphery of the column 600. The flowing of the low-$CO_2$ feed stream 402 into the internal annular sleeve 407 may create a "warming" wall for the column 600, thereby mitigating the accumulation of solid $CO_2$ upon the walls or plugging of the column 600 by the solid $CO_2$ in the slurry.

The low-$CO_2$ feed 402 may travel downward along the periphery of the walls of the column 600 in a control freeze zone 408 and collect on a melt tray 410. The low-$CO_2$ feed 402 may be contacted by a liquid spray 424 to form solid $CO_2$ 426. The solid $CO_2$ 426 may collect and melt on the melt tray 410 to form a $CO_2$ rich-liquid 422. The $CO_2$ rich-liquid 422 may cascade across the melt tray 410 and downward through stripping section 414 to accumulate as a pool of $CO_2$ rich-liquid 602 at the bottom of the stripping section 414. The pool of $CO_2$ rich-liquid 602 may exit the column 600 as a bottoms $CO_2$ rich-liquid 428 to be heated by a heat exchanger 430. A vapor reboiler stream 432 may re-enter the column 600 while a portion of the bottoms $CO_2$ rich-liquid 428 may exit the column 600 for other intended uses like EOR.

A vapor component may separate out of the low-$CO_2$ feed 402 to form hydrocarbon vapors 434, which may include a rich $CH_4$ vapor concentration. The hydrocarbon vapors 434 may continue to rise upward and out of the controlled freeze zone 408 and into a rectification section 416. A hydrocarbon vapor stream 436 may exit the column 600 and may enter a heat exchanger 438 to be chilled to produce a chilled hydrocarbon stream 440. The chilled hydrocarbon stream 440 may be directed into a reflux vessel 442 to be separated into liquid and gas phases. The liquid phase, as a reflux fluid stream 444, may enter the column 600 to flow downward through a series of mass transfer devices 445 through the rectification section 416 and collect on a collector tray 446 to be drawn off as a liquid stream 448, which may flow into a reflux drum 450 where the aforementioned liquid for spray 424 is collected. Upon exiting the reflux drum 450, the liquid for spray 424 may be pressurized in a pump 452 for reintroduction into the column 600 as a spray to aid in solidifying the $CO_2$ concentration in the low-$CO_2$ feed stream 402.

A portion of the chilled hydrocarbon vapors 440 that may not have condensed but remained in the vapor phase may exit the reflux vessel 442 as a final product stream 454. The final product stream 454 may include light hydrocarbon gases, primarily $CH_4$, that may be ultimately sold commercially.

The low-$CO_2$ feed stream 604 may enter a section of the column 600 where a high-$CO_2$ feed stream may typically enter, e.g., the stripping section 414. The $CO_2$ concentration in the high-$CO_2$ feed gas may include a concentration range of about 16 to 20%, about 16% to 24%, about 16% to 28%, or about 16% to 30%, or even about 16% to 40%. However, as previously discussed, the low-$CO_2$ feed stream 604 may have a $CO_2$ concentration of less than about 16 mol %, or less than 15 about mol %, or less than about 14 mol %, or less than about 13 mol %, or less than about 12 mol %, or less than about 11 mol %, or less than about 10 mol %, or from about 5 to 8 mol %, about 5 to 10 mol %, about 5 to 12 mol %, or about 5 to 14 mol %.

In one or more embodiments, the low-$CO_2$ feed stream 604 may enter a flash drum 606 prior to feeding into the column 600. It may be desirable to separate the low-$CO_2$ feed stream 604 in the flash drum 606 instead of feeding directly into the stripping section 414 if liquid/slurry formation is expected. After separation in the flash drum 606, a vapor stream 608 may be fed below the melt tray 410 and into the stripping section 414 and a liquid/slurry stream 610 may be fed into the controlled freeze zone 408. The fluid stream 610 may include a liquid-solid mixture of acid gas and heavier hydrocarbons that may fall upon the melt tray 410 to be warmed. The warmed liquids of the fluid stream 610 may flow downward into the stripping section 414 to mix with the $CO_2$ rich-liquid 422 that exits the column 600 as a bottoms $CO_2$-rich liquid 428, as previously discussed. Any light vapors, including $CH_4$, associated with the fluid stream 610 may rise into the controlled freeze zone 408 and may mix with the vapor 434 that rises upwards into the rectification section 416 of the column, as previously discussed.

The vapor 608 component of the low-$CO_2$ feed stream 604 may be separated to form a vapor stream and a liquid stream. The liquid stream may mix with the $CO_2$ rich-liquid 422 that exits the column 600 as a bottoms $CO_2$ rich-liquid 428, as previously discussed. The vapor stream may rise upward past the melt tray 410 and into the controlled freeze zone 408 to be contacted with the cold liquid spray 424 to freeze out any $CO_2$ and to form a $CH_4$ rich vapor stream. As previously stated, the solid $CO_2$ may melt upon the melt tray 410 to mix with the $CO_2$ rich-liquid 422. The $CH_4$ rich vapor stream may continue upward into the rectification section 416 and may mix with the vapors 434, as previously discussed.

Figure 7:
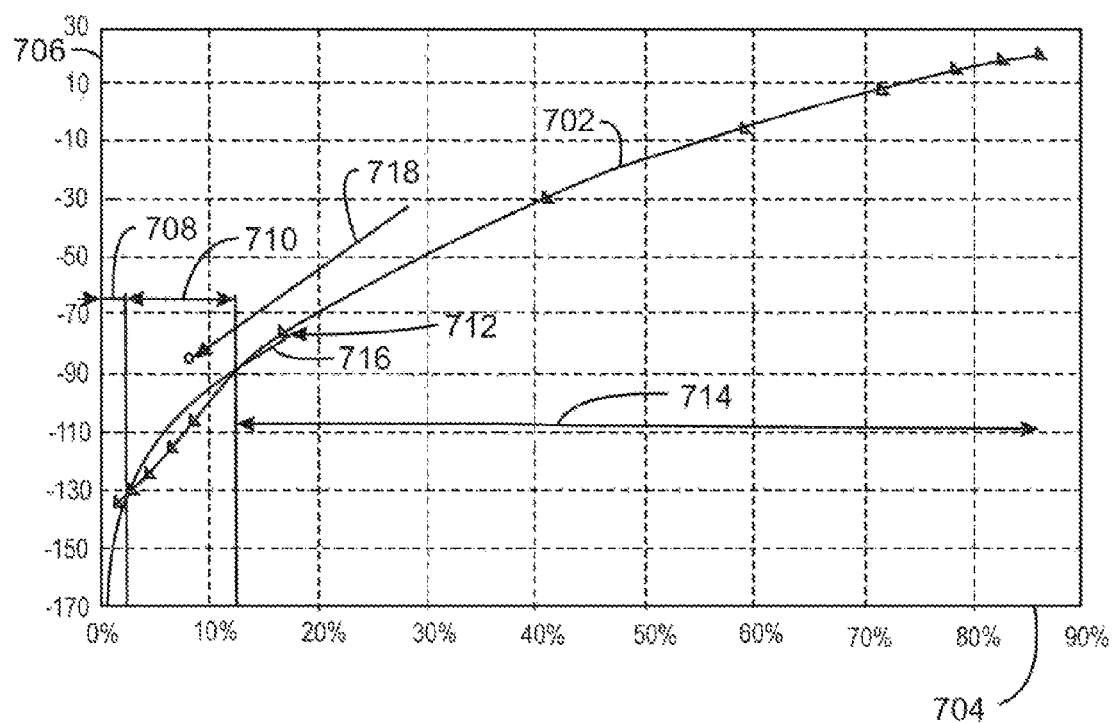
FIG. 7 is a graph of a $CO_2/CH_4$ temperature-freeze profile.

FIG. 7 is a graph 700 of a $CO_2/CH_4$ temperature-freeze profile 702. A $CO_2$ saturation concentration 704 as a function of temperature 706 within the cryogenic liquid may be illustrated in the graph 700. Solid $CO_2$ is present for conditions to the right of curve 702. As described herein, different sections of a cryogenic column may include a rectifying section 708, a controlled freeze zone (CFZ) section 710 including a melt tray 712, and a stripping section 714.

Within the range of $CO_2$ saturation concentrations 704 of the CFZ section 710, a $CO_2$ freezing curve 716 may occur between a 2 mol % and 12 mol % $CO_2$ concentration in the vapor phase. As shown in FIG. 7, the $CO_2$ freezing curve 716 includes a feed with a 2 mol % and 12 mol % $CO_2$ concentration in the vapor phase that may be introduced below the melt tray 712. When introduced below the melt tray 712, the $CO_2$ liquid may re-vaporize until the concentration has risen to about a 16% mol concentration. Thus, additional reflux refrigeration and power may be needed to re-condense the $CO_2$ and purify the vapor in an effort to produce a sales gas.

However, as described with respect to FIG. 3 and FIG. 4, it may be advantageous to introduce a feed gas with a $CO_2$ concentration in the range of 2 mol % to 12 mol % into a section of the column where the $CO_2$ content of the feed and the $CO_2$ content of the vapor within the column are approximately the same. As shown in FIG. 7, feed gas conditions 718 introduced into the CFZ section 710 may contain a 8% mol concentration of $CO_2$ at a process pressure of 471 psia and may be introduced above the melt tray 712. As discussed with respect to FIGS. 3 and 4, by introducing the feed gas above the melt tray 712 in the CFZ section 710, the possibility of re-vaporizing the $CO_2$ may be reduced, thus, improving power efficiency and minimizing power consumption.

Figure 8:
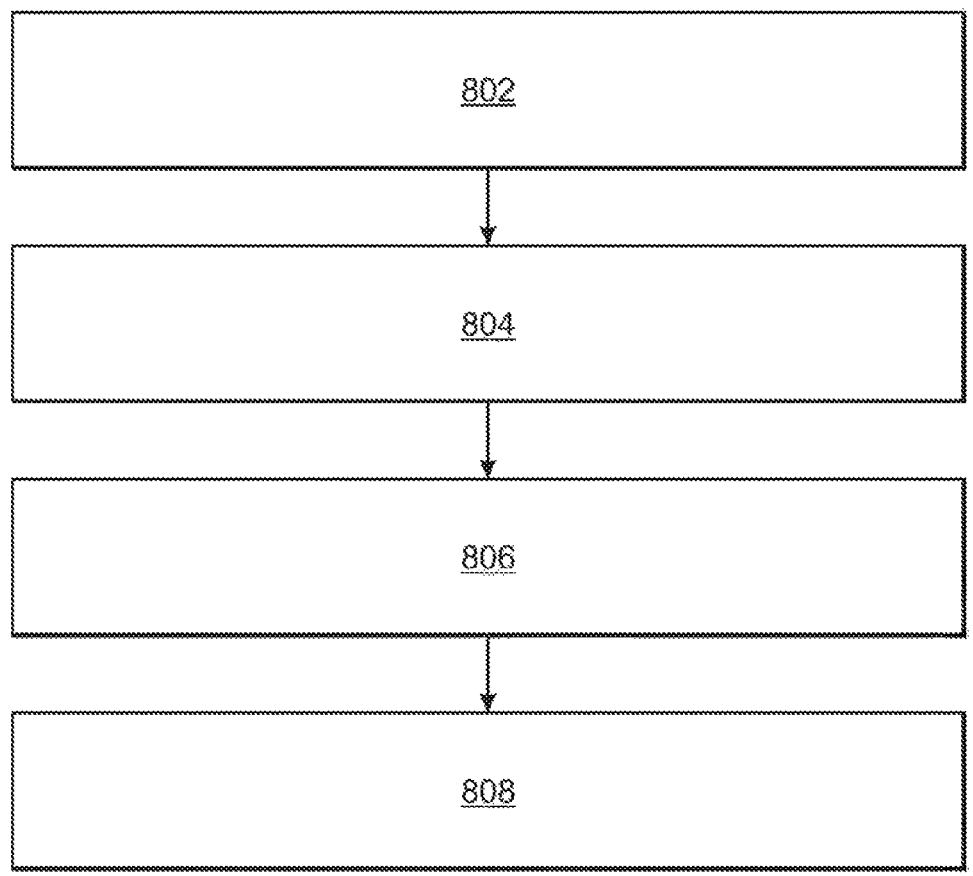
FIG. 8 is a method of processing a feed gas in a column.

FIG. 8 is a method 800 of processing a feed gas in a column in accordance with embodiments of the present techniques. At block 802, a feed gas may be fed into an intermediate zone of a column. The feed gas may flow through an internal sleeve and into a bottom portion of a controlled freeze zone of the column. At block 804, the feed gas may come into contact with a cold liquid to form a vapor stream and solid $CO_2$ in the intermediate zone, where the vapor stream may be rich in methane ($CH_4$). At block 806, the solid $CO_2$ may be warmed and liquefied on a melt tray located in the intermediate zone of the column, where the feed gas flowing in the internal sleeve of the column contributes to melting $CO_2$ solid accumulation. At block 808, the liquefied $CO_2$ may be removed from a lower section of the column.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method of controlling a temperature in a column, the method comprising feeding a feed gas into a port of a sleeve disposed around at least a portion of a periphery of the column, wherein:
    the sleeve comprises a space between an outer wall of the column and an inner wall of the column;
    the sleeve is disposed around a zone of the column that is configured to freeze at least one component of the feed gas;
    the port is disposed in an upper region of the sleeve;
    the sleeve is configured to channel the feed gas downward around the periphery of the column; and
    the sleeve is configured to release the feed gas into the column through an opening disposed at a point below the port where the feed gas is fed into the sleeve.

2. The method of claim 1, wherein the feed gas comprises a $CO_2$ concentration of less than about 16%.

3. The method of claim 1, wherein the flow of the feed gas in the sleeve is configured to melt a solid that has accumulated on the inner wall of the column.

4. The method of claim 1, wherein the feed gas is fed into the sleeve at a temperature above a freezing temperature for at least one component in the feed gas.

5. The method of claim 1, wherein a concentration of $CO_2$ in the feed gas that is fed into the sleeve matches a concentration of $CO_2$ in a zone of the column that is configured to freeze at least one component of the feed gas.

6. A method of separating an acid gas component from a raw natural gas stream in a column, the method comprising:
    maintaining a temperature of a zone in the column below the freezing point of an acid gas component in the raw natural gas stream;
    feeding the raw natural gas stream at a temperature above the freezing point of the acid gas component into an upper portion of an internal sleeve disposed around a zone of the column;
    flowing the raw natural gas stream downward through the internal sleeve to cool the raw natural gas stream and warm an internal wall of the column in the zone, melting accumulated solids from the inner wall; and
    releasing the raw natural gas stream into the column at a lower portion of the zone.

7. The method of claim 6, wherein the raw natural gas stream includes methane ($CH_4$) and acid gas.

8. The method of claim 6, wherein the acid gas is hydrogen sulfide ($H_2S$), carbon dioxide ($CO_2$), or sulfur dioxide ($SO_2$), or a combination thereof.

9. The method of claim 6, comprising feeding the raw natural gas stream at a temperature above the freezing temperature for $CO_2$ in the zone.

10. A column for the separation of a feed gas, the column comprising:
    an internal sleeve located around a periphery of a zone of the column; and a feed gas inlet located in an upper region of the internal sleeve, wherein the internal sleeve is configured to channel the feed gas downward around the periphery of the column; and an inner opening from the internal sleeve, configured to release the feed gas into the zone at a point below the feed gas inlet.

11. The column of claim 10, wherein the feed gas comprises methane ($CH_4$) and carbon dioxide ($CO_2$).

12. The column of claim 10, wherein the feed gas comprises a concentration of $CO_2$ that is lower than about 7%.

13. The column of claim 10, wherein a concentration of $CO_2$ in the feed gas that is fed into the internal sleeve matches a concentration of $CO_2$ in a zone of the column that is configured to freeze at least one component of the feed gas.

14. The column of claim 10, wherein the internal sleeve is positioned around the entire periphery of the zone or located within one or more quadrants related to the periphery of the zone.

15. The column of claim 10, comprising a slot in the internal sleeve, wherein the slot projects the feed gas toward a center of the column.

16. The column of claim 10, wherein the internal sleeve is generally cylindrical, generally frustoconical, generally funnel-shape, generally tapered, or a combination thereof.

17. The column of claim 10, wherein the internal sleeve extends downwards from substantially the top of the zone, substantially from the middle of the zone, or substantially from the bottom of the zone.

18. The column of claim 10, wherein the internal sleeve terminates substantially in a middle portion of the zone, substantially in a lower portion of the zone, in close proximity to a top portion of a melt tray, or substantially within an internal section of the melt tray.

19. The column of claim 10, wherein a spray nozzle section is directed to spray a liquid inside of the internal sleeve, into a center of the zone, or a combination thereof.

* * * * *